United States Patent [19]
Chande et al.

[11] Patent Number: 4,838,631
[45] Date of Patent: Jun. 13, 1989

[54] LASER BEAM DIRECTING SYSTEM

[75] Inventors: Tushar S. Chande, Schenectady; Marshall G. Jones, Scotia; Angel L. Ortiz, Jr., Ballston Lake; John L. August, Jr., Schenectady, all of N.Y.

[73] Assignee: General Electric Company, Schenectady, N.Y.

[21] Appl. No.: 944,771

[22] Filed: Dec. 22, 1986

[51] Int. Cl.$^4$ ............................................. G02B 5/172
[52] U.S. Cl. .................................. 350/6.6; 350/96.18; 350/486; 350/642; 219/121.77; 219/121.8; 219/121.75
[58] Field of Search ................... 350/6.1, 6.2, 6.5, 6.6, 350/96.13, 96.15, 96.16, 96.18, 96.20, 486, 6.8, 164, 166, 642; 219/121 LT, 121 LW, 121 LU, 121 LR; 358/901

[56] References Cited

U.S. PATENT DOCUMENTS

| | | | |
|---|---|---|---|
| 4,015,100 | 3/1977 | Gnanamuthu et al. | 219/121 |
| 4,099,829 | 7/1978 | Straayer | 350/6.6 |
| 4,208,094 | 6/1980 | Tomlinson, III et al. | 350/96.20 |
| 4,498,730 | 2/1985 | Tanaka et al. | 350/96.16 |
| 4,534,615 | 8/1985 | Iwasaki | 350/6.2 |
| 4,564,736 | 1/1986 | Jones et al. | 219/121 L |
| 4,592,622 | 6/1986 | Hashimoto et al. | 350/6.8 |
| 4,676,586 | 6/1987 | Jones et al. | 350/96.20 |
| 4,681,396 | 7/1987 | Jones | 350/96.18 |

FOREIGN PATENT DOCUMENTS

| | | |
|---|---|---|
| 0067761 | 12/1982 | European Pat. Off. . |
| 0153243 | 8/1985 | European Pat. Off. . |
| 0158551 | 10/1985 | European Pat. Off. . |
| 921331 | 1/1982 | Japan . |
| 2099175 | 12/1982 | United Kingdom . |
| 2146455 | 4/1985 | United Kingdom . |

OTHER PUBLICATIONS

"Precision, Post-Objective, Two-Axis, Galvanometer Scanning" by Pelsue, Society of Photo-Optical Instrumentation Engineers, vol. 390, pp. 70–78, 1983.
"Ocular Manipulator for Robotic Vision" by Montagu et al., Society of Photo-Optical Instrumentation Engineers, vol. 449, pp. 88–93, 1983.
Description of Robolase Systems, Inc., 'Octopus' System from New Equipment Reporter, Jun. 1985, vol. 43, No. 6.
'Octopus' System Technical Specifications and Drawings published by Robolase Systems, Inc.
Descriptive Information published by Robolase Systems, Inc. on the "Robolase Star Coupler", Laser to Fiber Coupler, and 'Octopus' System.
Descriptive Information published by General Scanning, Inc., on the G350D Galvanometer Scanner and the XY3035 Scanner.
Descriptive Information published by Lumonics on its "Multiflex" Laser Beam Delivery System and Beam Injection into a "Permalux Power Fiber".

*Primary Examiner*—John K. Corbin
*Assistant Examiner*—Ronald M. Kachmarik
*Attorney, Agent, or Firm*—Paul R. Webb, II; James C. Davis, Jr.

[57] ABSTRACT

A system for directing successive beam pulses of a pulsed laser into different optical fibers, for transmission therethrough, is disclosed. The system comprises at least one lens, a plurality of optical fibers with the tips thereof positioned proximate a focal point of the lens, and at least one galvanometer driven mirror for directing a laser beam through the lens for focusing separately onto each fiber tip. The galvanometer, driven by computer generated position addresses, moves the mirror, between laser pulses, to predetermined positions each effective to direct the laser beam, through the lens, into one of the fiber tips for transmission via the fiber to a remote workstation location. In a first illustrated embodiment, a single mirror is mounted to direct the laser beam into fiber tips positioned substantially in the same plane and proximate the focal points of eight lenses. In a second illustrated embodiment, two mirrors are respectively mounted to scan the laser beam along "x" and "y" coordinate directions to direct the laser beam into fiber tip positioned proximate the respective focal points of four lenses.

53 Claims, 8 Drawing Sheets

LASER BEAM DIRECTING SYSTEM

The present invention is directed in general to laser systems used in manufacturing and, more particularly, to a laser system which enables sharing a single laser among multiple workstations.

BACKGROUND OF THE INVENTION

High power gas and solid state lasers have gained acceptance in manufacturing today by reducing costs and improving product quality. The utilization of such lasers as a percentage of the time they are available for use is, however, low. This is the case since, typically, such applications are set up on a one laser per workstation basis. As a result, these applications experience a high set-up to process time ratio and a large capital cost per workstation.

A design objective of such laser workstations is to provide flexibility in applying the beam generated by a single laser, e.g. to effect a weld, at a plurality of physically different locations. Such flexibility serves to improve laser utilization. One technique known in the art for providing such flexibility is to direct the laser beam through one end of an optical fiber so that the other end of the fiber may be moved between a plurality of different locations on a workpiece. Apparatus for the practice of such a technique is disclosed in U.S. Pat. No. 4,564,736. A second technique known in the art for providing such flexibility is to divert a laser beam among different points on a workpiece and/or between workstations by means of mirrors and refracting elements. Typically, the total distance that the beam of a commercially available rod laser can travel, before diverging to an unusable size, is small (e.g. less than 2 meters). Thus, the total number of work stations among which a laser beam can be diverted is greatly limited by the total distance the beam can travel. As a result, improvement in laser utilization that can be achieved by diverting the laser beam in this fashion is limited. A third technique known in the art to increase flexibility of laser use is to split the laser beam into multiple portions each of which is diverted to a different work location. A substantial drawback to this technique is the reduced laser power, caused by the beam splitting, delivered to each work location.

Uses of lasers in marking applications are known in the art and comprise apparatus for directing a laser beam onto a surface for the purpose of scribing information thereon. One type of apparatus for marking (writing) with a laser beam utilizes a pair of galvanometer driven mirrors which respectively deflect, or scan, the beam alng "x" and "y" orthogonal directions. The galvanometer movements are controlled to cause the desired information to be written. Such applications include a focusing lens to focus the laser beam to a small point to provide readable characters. Usually such marking applications employ post-objective scanning wherein the beam is passed through the focusing (objective) lens before being diverted or scanned by the mirrors. One desirable feature of post-objective scanning is that the diameter of the beam is small when it strikes the mirrors, thereby enabling the use of small mirrors. The small mirrors have a relatively low inertia so that faster galvanometer movement and increased operating speed of the marking apparatus are possible.

There are marking applications in which pre-objective scanning is employed. The difficulties in applying pre-objective scanning in marking applications are described in the paper entitled "Precision, Post-Objective, Two-axis, Galvanometer Scanning" by Kurt Pelsue, Society of Photo-Optical Instrumentation Engineers, Volume 390, 1983, which is incorporated in its entirety herein by reference. Due to the high accuracy required in beam placement and the fact that a relatively large diameter unfocused beam is scanned by the mirrors over the focusing lens, a special f-$\theta$ lens is required. As described in the above cited paper, the f-$\theta$ lens is used to implement corrections into the laser beam incident thereon. However, the f-$\theta$ lens introduces distortions into the scanned pattern on the marked surface. Further, the design of the f-$\theta$ lens is unique to the parameters of the system in which it is implemented so that minor changes in system of configuration necessitate expensive lens redesign and fabrication. Thus, for these reasons also, post-objective scanning is preferred in marking applications. A different type of marking application utilizes one or more nonlinear optical crystals, instead of the mirror and galvanometer combination described above, to scan the laser beam over the marked surface. Such optical crystals change their refractive index in direct proportion to an applied voltage. Characteristic of optical crystal applications and a major drawback thereof is that very high voltages (on the order of kilovolts) are required to produce minute beam deflections. This necessitates providing the components to generate and modulate the high voltages. Further, the beam deflections so produced are small, thereby limiting the utility of the crystals in such applications.

It is an object of the present invention to provide apparatus which enables substantial improvement in power laser utilization and reduction in capital cost per workstation.

SUMMARY OF THE INVENTION

In accordance with the present invention there is provided apparatus for directing a light beam into a plurality of optical fibers. The apparatus comprises a lens for focusing the light beam, means for supporting the optical fibers with the tips thereof positioned proximate the lens focal point, and reflector means for directing the laser beam through the lens to selectively focus the beam separately onto each of the fiber tips. The reflector means comprises a mirror mounted on the shaft of a galvanometer. The apparatus further includes control means for controlling the movement of the galvanometer to orient the mirror in a plurality of predetermined positions each corresponding to the light beam being focused by the lens onto a different one of the fiber tips.

The apparatus of the present invention enables a pulsed power laser beam, such as generated by a neodymium:yttrium aluminum garnet (YAG) laser, to be directed into a plurality of optical fibers for transmission therethrough to different workstation locations where the laser can be used. The pulsed laser beam alternates between an on state and an off state and the control means is adapted to move the galvanometer shaft, and mirror mounted thereon, during the laser beam off state. In a first illustrated embodiment of the present invention, a single galvanometer with a mirror mounted on the shaft thereof is provided to direct the laser beam separately through a plurality of focusing lenses. A fiber holder associated with each lens holds at least one fiber with the tip thereof proximate the lens focal point. The fiber tips and an axis of the laser beam are substantially disposed in a common plane. A flat reflecting surface of the mirror and the lenses are perpendicular to the common plane.

In a second illustrated embodiment of the present invention, two galvanometers, each with a mirror mounted on the shaft thereof, are provided to direct the laser beam separately through a plurality of focusing lenses. A fiber holder associated with each lens holds at least one fiber with the tip thereof proximate the lens focal point. The mirrors are positioned so that a first one of the mirrors directs the laser beam onto a second one of the two mirrors. The mirrors are further positioned so that movement of the first mirror, by its galvanometer, scans the laser beam along a first coordinate axis direction and movement of the second mirror, by its galvanometer, scans the laser beam along a second coordinate axis direction.

In operation of either illustrated embodiment, the control means include a digital computer which generates a sequence of position addresses effective to move the galvanometer(s) to the predetermined positions each of which causes the laser beam to be directed into a different optical fiber. The rapid reorientation between laser pulses results in full laser power being delivered to the output ends of the optical fibers into which the laser beam is directed.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

DESCRIPTION OF THE INVENTION

Figure 1:
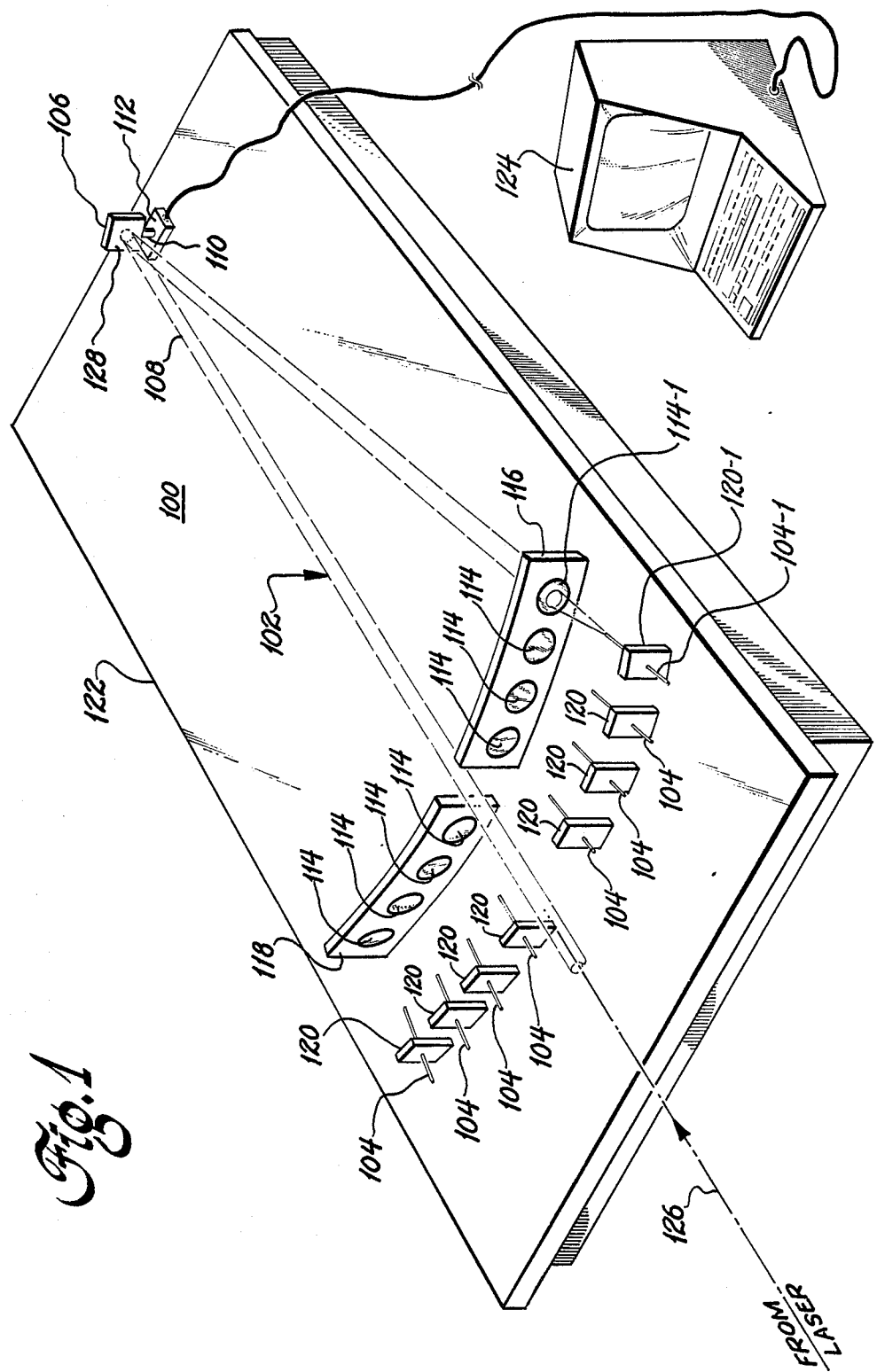
FIG. 1 is an isometric representation of a laser beam directing system constructed in accordance with a first embodiment of the present invention.

Referring now to the drawings, FIG. 1 illustrates a laser beam directing system 100, constructed in accordance with a first embodiment of the present invention, for directing power laser beam 102 into a selected one of a plurality of optical fibers 104. System 100 includes a mirror 106 for reflecting an incident portion 108 of beam 102. Mirror 106 is rigidly affixed to a shaft 110 of a galvanometer 112 which can position the shaft, and mirror 106 affixed thereto, in any one of a plurality of predetermined positions. Each of these predetermined positions enables reflection of the laser beam, by mirror 106, through a lens 114 for focusing onto the tip of a different one of optical fibers 104. As seen in FIG. 1, there are a plurality of lenses 114, each rigidly held in one of two lens supports 116 and 118. A space is provided between the lens supports so that incident portion 108 of beam 102 can be introduced therebetween.

Each optical fiber 104 is supported in a fiber holder 120 such that the tip of the fiber is positioned proximate a focal point of an associated one of lenses 114. Thus, as illustrated in FIG. 1, the tip of fiber 104-1 is held proximate the focal point of lens 114-1 by fiber holder 120-1. There is provided a different fiber holder 120 for each lens 114. The galvanometer, fiber holders and lens supports are rigidly mounted on a base 122 to maintain appropriate alignment therebetween. Base 122 may comprise an optical breadboard. It is noted that where the elements of system 100 are mounted in an enclosure, they may be supported from the enclosure walls or top, rather than the base, according to the most convenient means for rigidly maintaining their alignment. System 100 further includes control means comprising a digital computer 124 for controlling the position of galvanometer 112 in a programmed fashion. The control means further includes a control interface circuit, not shown in FIG. 1, coupled between the computer and galvanometer and described in detail hereinbelow. Computer 124 may be provided as an IBM PC/AT computer.

An axis 126 of laser beam 102 and the tips of optical fibers 104 lie substantially in a common plane. It is preferred herein that beam 102 reflect off a front, substantially flat reflecting surface 128 of mirror 106. Galvanometer shaft 110 is oriented, and mirror 106 is mounted thereon, so that for all of the predetermined positions of the mirror and shaft, reflecting surface 128 is perpendicular to the common plane. Additionally, all lenses 114 are mounted equidistantly from a central point on reflecting surface 128 of mirror 106. Further, each lens is disposed in a plane substantially perpendicular to the common plane.

Figure 2:
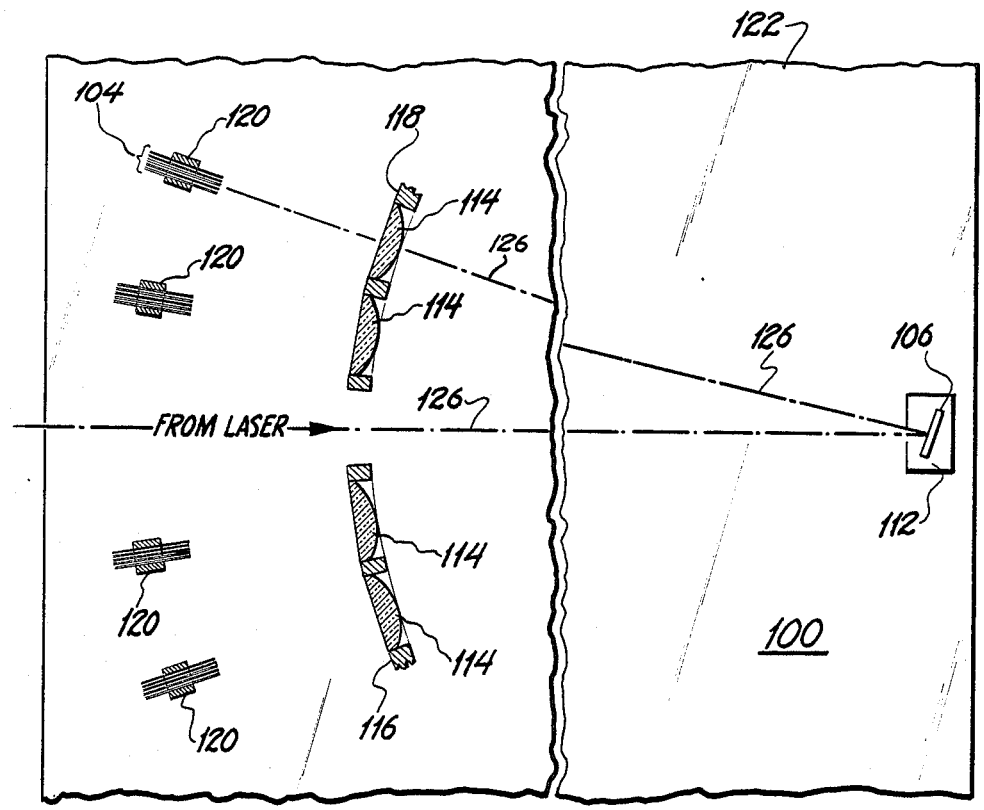
FIG. 2 is a plan view of the beam directing system illustrated in FIG. 1, including sectional views of selected elements thereof.

FIG. 2 is a plan view of system 100 including sectional views of supports 116 and 118, lenses 114 and fiber holders 120. As seen in FIG. 2, a plurality of fibers 104 can be mounted in each fiber holder 120. However, there is no restriction that the same number of fibers need be mounted in each holder. Where there are multiple fibers held in a fiber holder, the respective tips thereof all lie substantially in the common plane, as described above. It is preferred herein that each fiber holder be fabricated of a laser beam transparent material in order to avoid damage that would otherwise result should the laser beam be momentarily misdirected. Each fiber holder should also enable easy removal and replacement of fibers as well as axial adjustability of each fiber along the axis of the fiber.

Each lens 114 is preferably a commercially available antireflection coated quartz plano-convex lens, with the planar side facing the fiber tips. It is noted that preobjective scanning of the laser beam is successfully employed in the practice of the present invention without the need for special purpose focusing lenses such as the f-θ lens referred to hereinabove. As stated above, the tips of the optical fibers are mounted proximate the focal point of the lens associated therewith. With the tips so positioned, small changes in the position of mirror 106 result in the laser beam being focused on different ones of the fibers held in a particular fiber holder.

Figure 3:
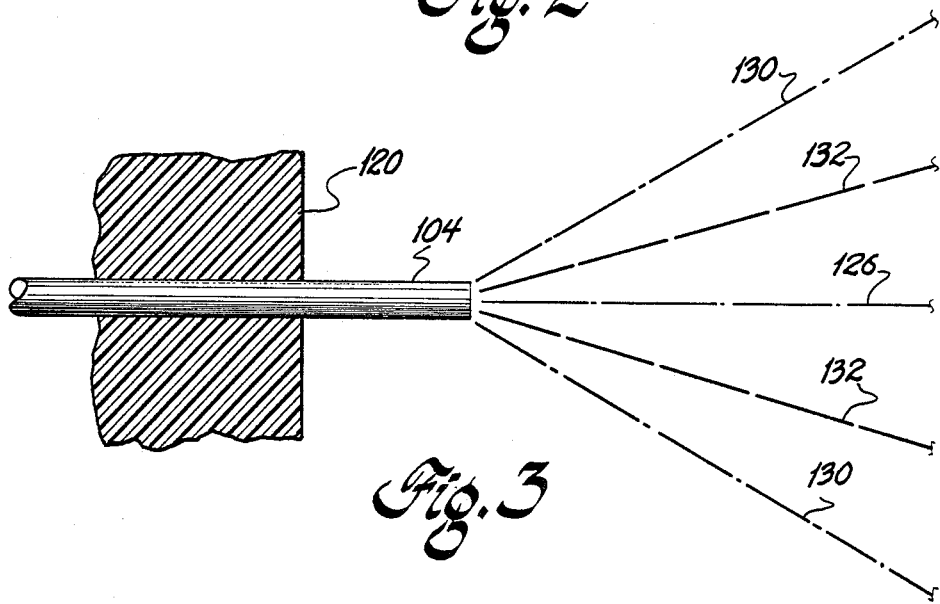
FIG. 3 is a diagrammatic illustration of a laser beam being injected into an optical fiber.

Referring also to FIG. 3 and as is known in the art, an intrinsic characteristic of each optical fiber is a cone of acceptance 130, at the fiber tip, within which a focused, converging portion 132 of the laser beam must fall in order to enter into the optical fiber and be fully transmitted thereby. Further, the spot size of the focused laser beam on the fiber tip must have a diameter less than or equal to that of the tip. If the diameter of the focused beam spot is greater than that of the fiber tip, damage may be done to the fiber, fiber holder and/or any surrounding surfaces. The cone of acceptance and spot size limitations serve to dictate the focal length of each lens 114. It is also noted that there is some latitude in positioning each fiber tip, substantially along beam axis 126 subject to the above constraints. Thus, each fiber tip need not be positioned precisely at a lens focal point.

System 100 is especially adapted to enable the power of a single pulsed laser to be deployed at a plurality of remote workstation locations substantially simultaneously without splitting, refracting or reflecting the laser beam between the workstations. This is accomplished by injecting the successive laser beam pulses respectively into selected ones of the fiber tips in rapid succession. The full power of the laser beam is thereby delivered as a plurality of pulses to a remote output end of each fiber into which it is injected, the delivered laser power being limited substantially only by power losses within the fiber. Thus, with a laser and the beam directing system of the present invention connected to a plurality of remote workstation locations by means of a plurality of optical fibers, the full power of the single laser can be delivered to each of those remote locations.

In applications where welding or drilling are performed at each workstation, as is preferred herein, system 100 is particularly adapted for use with a pulsed power laser such as a neodymium:yttrium aluminum garnet (Nd:YAG) pulsed rod laser, available from Raytheon Corporation as model #SS550. That laser is rated to provide 400 watts average power, a maximum of 50 joules/pulse at a pulse rate of 0 to 200 pulses per second, the pulse length being variable from 0.1 to 9 milliseconds.

Following each pulse of the laser beam, the galvanometer can move mirror 106 to a different one of its predetermined positions. As stated above, this is done in a programmed fashion under control of computer 124, so that any or all of the tips of fibers 104 can be injected in any desired sequence. The rate at which the fibers can be injected is determined in part by the pulse rate capability of the laser and by the speed with which galvanometer 112 can move mirror 106 to a different predetermined position between laser beam pulses. Galvanometer 112 can be provided as a moving-iron galvanometer scanner model G350DT and an associated driver amplifier model CX660, both manufactured by General Scanning, Inc., located in Watertown, Mass.

The speed with which the galvanometer can move the mirror mounted thereon is limited by the inertia of the mirror. Where the beam quality (BQ) of the laser beam is relatively poor, the incident laser beam will have a relatively high divergence and represent a large spot on the mirror. A poor BQ, for a power laser, is considered herein to be one in the range of 125 to 200 mm-mrad at approximately 400 watts average power. The reflecting surface of the mirror must be large enough to reflect the entire beam. Thus, the worse the BQ, the larger the mirror required to reflect the beam, and the larger the mirror, the slower the galvanometer speed capability. While the theoretically best BQ achievable for a Nd:YAG laser is on the order of 2 mm-rad, the best BQ practically achieved to date in a commercial rod laser, to the knowledge of applicants, is only on the order of 80 mm-mrad at approximately 250 watts average power. The BQ of the above described Raytheon manufactured laser is on the order of 125 mm-mrad. Such BQ values for power lasers are distinguishable from values found in laser marking applications. For example, lower power Q-switched rod lasers (10–50 watts average power) are known to be used in such applications and characteristically have a BQ on the order of 7–15 mm-mrad. Thus, the present invention can even be successfully practiced with a laser having a poor beam quality. In practice, using the above noted General Scanning galvanometer to deflect a beam generated by the Raytheon manufactured laser, a galvanometer switching rate of up to 15 Hz was achieved.

The type of laser beam used determines in part the optical fiber material best suited for beam transmission. It is preferred herein that fused quartz fibers be used to transmit the Nd:YAG laser beam. Additionally, the tips of the optical fibers require preparation in order to enable efficient injection of the focused laser beam. One suitable fiber tip preparation technique, preferred herein, is described in U.S. Pat. No. 4,564,736 which is assigned to the assignee of the present invention and incorporated in its entirety herein by reference.

As a further feature of the present invention, reflecting surface 128 of mirror 106 is coated with a dielectric material to enhance its ability to reflect, without damage thereto, the incident power laser beam. The dielectric material coating is selected to provide a high reflectivity for the particular wavelength of laser being used, e.g. 1060 nanometers for the Nd:YAG laser. Further, the dielectric coating characteristically provides a reflectivity that depends on the angle at which the laser beam falls incident thereon, i.e. an angle between the axis of the laser beam and the reflecting surface normal. The coating provides a maximum reflectivity of nearly 100% when the beam is approximately at a prescribed angle to the reflecting surface and provides increasingly lower reflectivities for incident angles greater or less than the prescribed angle. In system 100, the prescribed angle is 45°. Mirror 106 can be fabricated in accordance with the above wavelength and prescribed angle specificatins by CVI Laser Corporation of Albuquerque, N.M. While it would appear that the dielectric coating is better suited for fixed mirror applications, its ability to reflect and withstand without damage the power laser beam renders it well suited for use in practicing the present invention. By selecting the distance between the mirror and the lenses, as well as the between-lens spacing, to minimize the total angular movement required of the mirror, total losses in efficiency due to reduced mirror reflectivity are minimized. In practice, a total range of angle of incident of ±10° about the prescribed angle was successfully used.

It is preferred herein, primarily for safety reasons, that the elements of system 100 mounted on base 122 be enclosed in a light tight enclosure (not shown). As a result, in the case of an element failure, any stray portions of the laser beam will be contained in the enclosure. A further result of enclosing the elements is to minimize the deposition of airborne particles, e.g. dust, proximate the fiber tips. Upon exposure to the laser beam, such particles may burn and damage the fibers.

Figure 4:
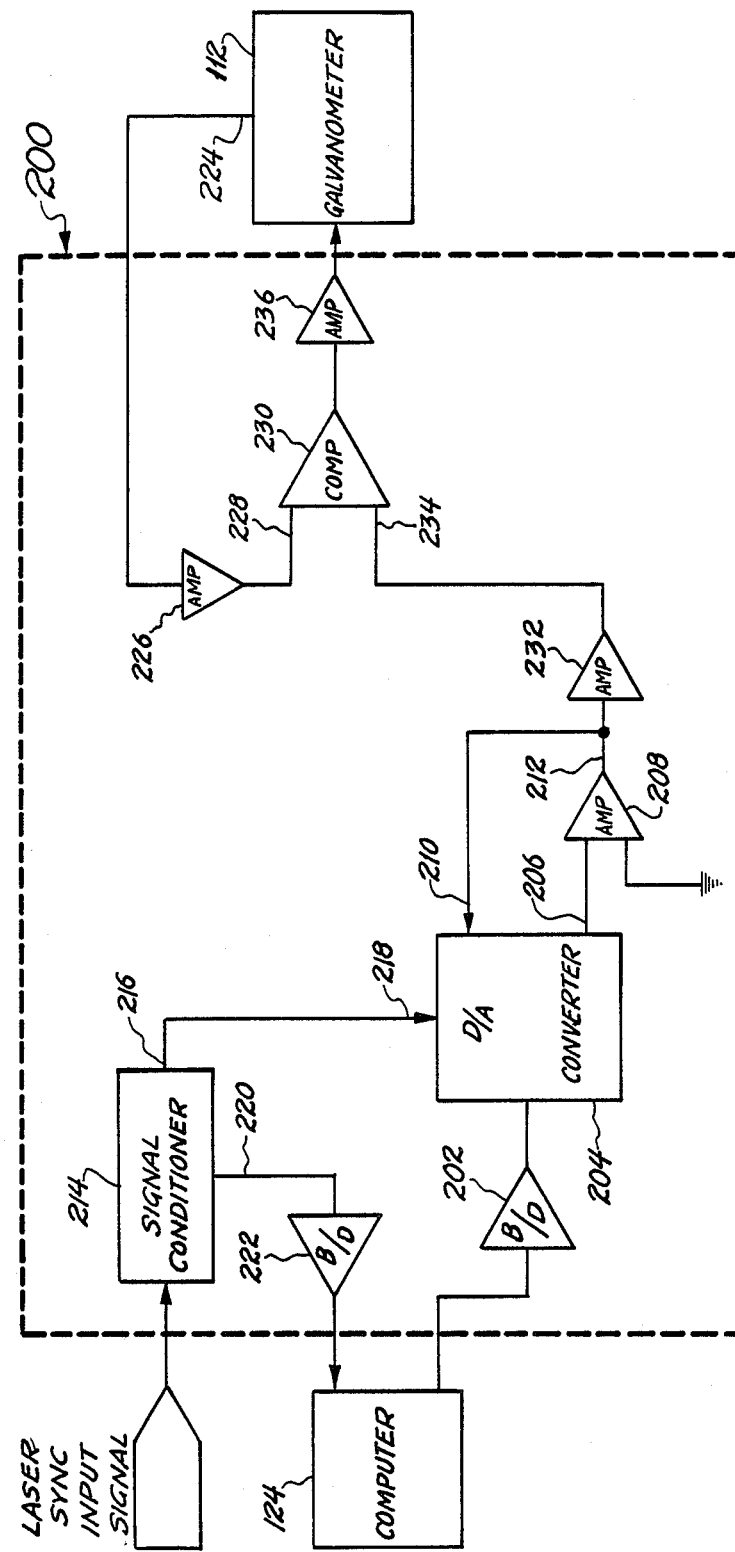
FIG. 4 is a block diagram representation of a control circuit employed in the practice of the first embodiment of the present invention.

Means for the control of galvanometer 112 with computer 124 are illustrated in FIG. 4. The computer is coupled to the galvanometer through a control interface circuit 200. Circuit 200 comprises a buffer driver circuit 202 for receiving an 8-bit galvanometer position address from computer 124. Each such galvanometer address corresponds to one of the mirror predetermined positions for injecting the laser beam into a different optical fiber. Circuit 202 is provided to compensate for parameters (e.g. capacitance) in interconnecting cables and for conditioning the digital address signal for application to a digital-to-analog (D/A) converter 204. D/A converter 204 provides an analog signal, on its output 206, corresponding to the digital input signal applied thereto. D/A converter 204 may be provided as an 8-bit buffered multiplying digital-to-analog converter available as model #AD75245N from Analog Devices, Inc. Analog output 206 is coupled to an amplifier 208, an output 212 of which is fed back to a feedback input 210 of the D/A converter. Amplifier 208 and the feedback connection the D/A converter serve to stabilize the converter analog output signal, the stabilized signal being provided on output 212 of amplifier 208. Interface circuit 200 further comprises a signal conditioner 214 for receiving a synchronizing input signal provided by the laser. The synchronizing signal consists of a sequence of pulses each of which immediately precede a laser pulse, as is known in the art. Signal conditioner 214 includes circuitry which in response to the synchronizing signal provides on an output 216 a pulsed write enable signal which is applied to an enable input 218 of the D/A converter. The write enable signal pulses correspond to periods when the laser beam is in the off state. The D/A converter is adapted to only respond to, i.e. process, the digital address applied thereto when the write enable signal is present. As a result, each write enable signal pulse defines a window during which the galvanometer driven mirror can be moved from one to another of its predetermined positions. Signal conditioner 214 delays the opening of the window so that the opening occurs only when the laser is in the off state. The signal conditioner adjusts the width of the window so that it closes before the next laser pulse is generated. With each window so conditioned, a safety margin is inherent in the operation of system 100.

An output 220 of the signal conditioner applies the write enable signal to computer 124 via a buffer driver circuit 222. Circuit 222 is provided to perform substantially the same function as circuit 202. The write enable signal so applied to the computer determines when galvanometer position addresses are generated by the computer for application to the D/A converter.

Galvanometer 112 includes an output 224 on which it provides an analog signal proportional to the position of the galvanometer shaft (and mirror 106 affixed thereto). The shaft position is fed back through an amplifier 226 and applied to a first input 228 of a comparator 230. The stabilized analog output signal on output 212 of amplifier 208 is amplified by an amplifier 232 and applied to a second input 234 of the comparator. Amplifiers 226 and 232 are selected to have gains enabling the analog address and galvanometer position signals to be directly compared. Comparator 230 provides an error signal, representative of the deviation of the actual galvanometer shaft position from a desired position, which is amplified by an amplifier 236 and then applied to the galvanometer as a galvanometer drive signal. With respect to the above-noted galvanometer and driver amplifier manufactured by General Scanning, Inc., the error signal is applied to and shaft position fed back from the driver amplifier. The driver amplifier is in turn coupled to drive the galvanometer.

In operation, system 100 is connected through optical fibers 104 to one or more workstations for transmission thereto of laser beam 102. Each optical fiber holder 120 holds one or more optical fibers. One or more optical fibers emanating from any optical fiber holder can be connected to each workstation. Computer 124 is programmed to provide the 8-bit addresses of the galvanometer shaft predetermined positions which direct the laser beam, through each lens 114, onto only the tips of fibers connected to workstations to which the beam is to be transmitted. The addresses may be provided by the computer in any predetermined order, though preferably an order that minimizes mirror movement from address to address. The addresses are provided in accordance with the write enable signal and, as described above, the D/A converter is enabled to respond to a newly applied address only upon receiving the write enable signal. In the absence of the write enable signal, when the laser is in the one state, the D/A converter maintains on its output 206 the analog signal corresponding to the last applied digital address. Amplifer 208 and the feedback connection to converter input 210 hold the analog output signal steady, as is required since mirror movement during the laser beam on state is highly undesirable. The closed loop feedback of galvanometer position to comparator 230 further serves to hold the mirrors steady and in the correct predetermined position. Thus, system 100 operates in a "hot switching" mode wherein the mirror movement is effected between laser pulses. The mechanical shutter typically provided with power lasers remains open throughout normal system operation.

Figure 5:
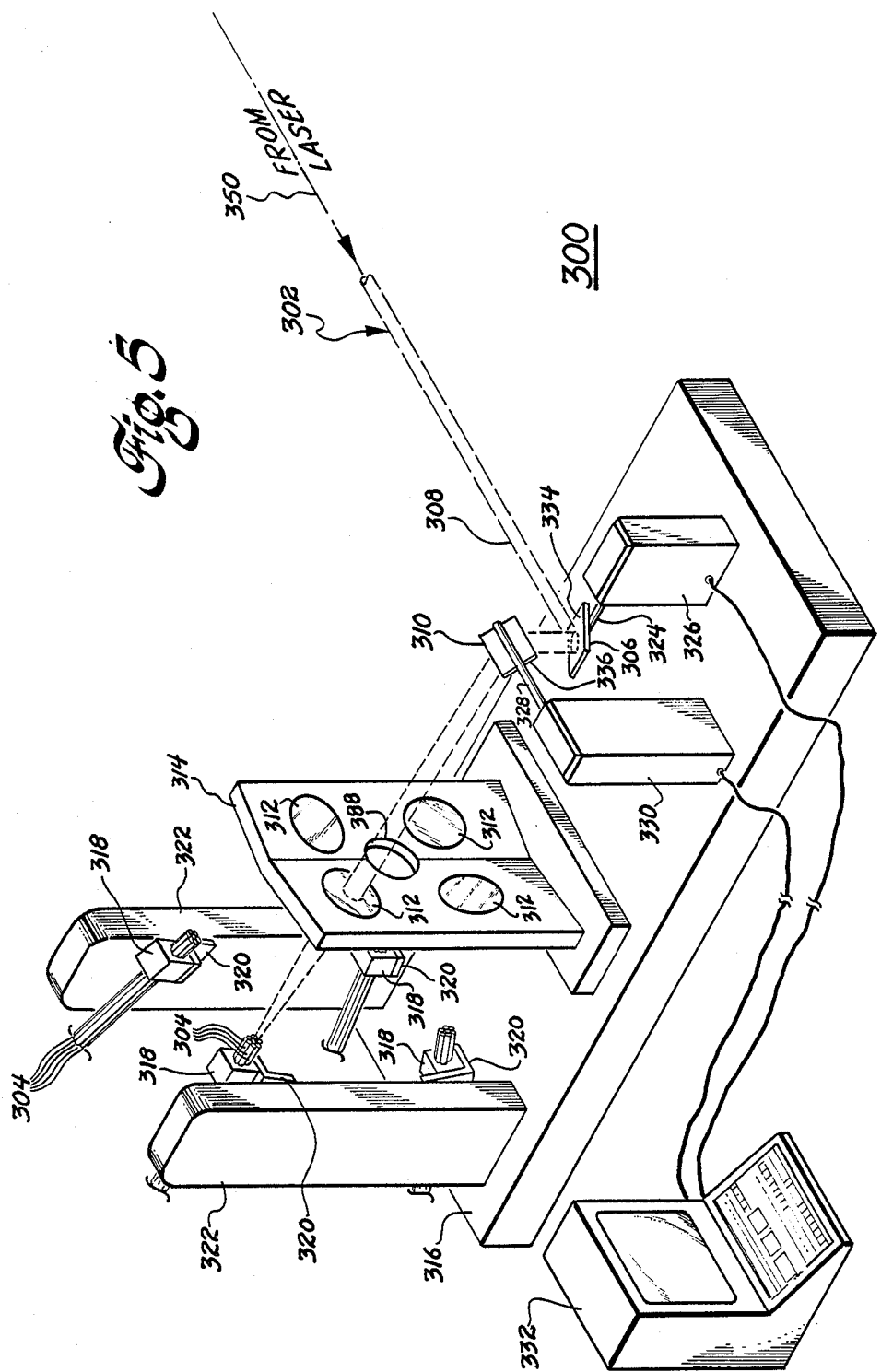
FIG. 5 is an isometric representation of a laser beam directing system constructed in accordance with a second embodiment of the present invention.

FIG. 5 illustrates a laser beam directing system 300, constructed in accordance with a second embodiment of the present invention, for directing a power laser beam 302 into a selected one of a plurality of optical fibers 304. System 300 includes a mirror 306 which reflects an incident portion 308 of the laser beam onto a second mirror 310. The beam is reflected off of mirror 310 which directs it to one of four focusing lenses 312 for focuing the beam onto the tip of one of optical fibers 304. Lenses 312 are plano-convex lenses, substantially the same as described above for use in system 100, each with the planar face presented to the fiber tips. The lenses are rigidly mounted in a lens holder 314 which is in turn rigidly mounted to a base member 316, which may comprise an optical breadboard. A group of one or more optical fibers is associated with each lens and have their respective fiber tips positioned proximate a focal point of their associated lens. Each group of fibers is rigidly held, with the tips thereof so positioned, in a fiber holder 318. The fiber holders are rigidly affixed to brackets 320 which are rigidly mounted to two support members 322. Support members 322 are in turn rigidly mounted to base member 316. Fiber holders 318 are substantially the same as holders 120 (FIGS. 1 and 2) described above.

Mirror 306 is rigidly affixed to a shaft 324 of a galvanometer 326 so that the mirror moves with the shaft. Similarly, mirror 310 is mounted on a shaft 328 of a galvanometer 330 for movement therewith. Galvanometers 326 and 330 may be provided as a moving-iron galvanometer scanner model XY3035 manufactured by General Scanning, Inc. System 300 further includes control means comprising a digital computer 332 for controlling the respective positions of galvanometer shafts 324 and 328, and mirrors 306 and 310 respectively affixed thereto, in a programmed fashion. The control means further includes an interface circuit, not shown in FIG. 5, coupled between the galvanometers and computer and described in detail below.

Mirrors 306 and 310 respectively include front, substantially flat reflecting surfaces 334 and 336 for reflecting the laser beam. Each reflecting surface is coated with a dielectric material as described above for reflecting surface 128 of mirror 106 in system 100. Thus, the prescribed angle between the reflecting surface normal and the axis of the beam falling on that surface determines the surface reflectivity. The prescribed angle for mirrors 306 and 310 is 45°. The mirrors can be fabricated by the above-noted CVI Laser Corporation.

Figure 6:
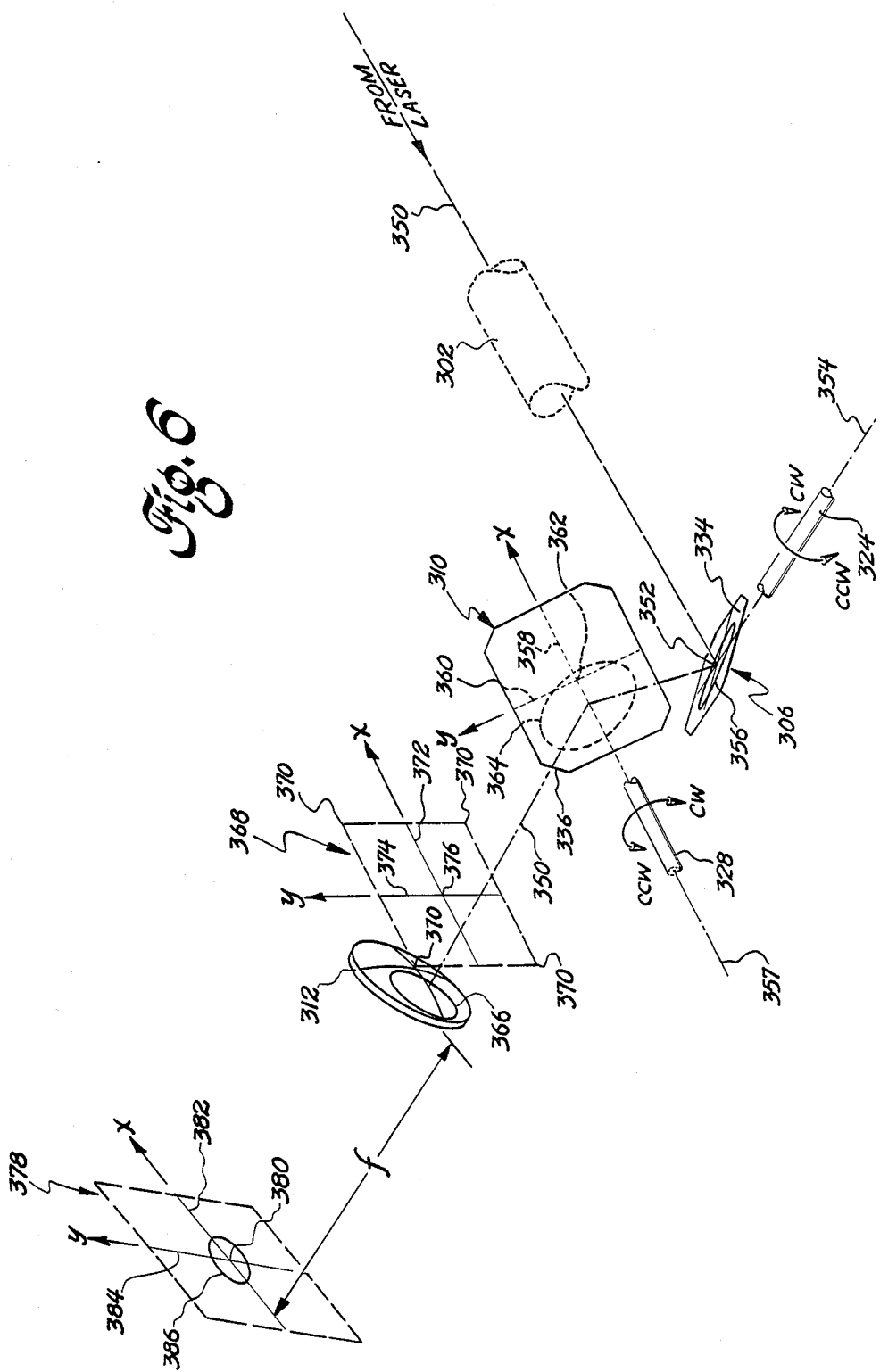
FIG. 6 is a diagrammatic illustration of a laser beam trajectory as directed by the mirrors employed in the second embodiment of the present invention.

Each galvanometer shaft 324 and 328 is rotatable about its respective axis to position the mirror affixed thereto to reflect laser beam 302 onto a particular one of lenses 312 in order to focus the laser beam onto the tip of a particular optical fiber. The trajectory followed by the laser beam as determined by the positions of mirrors 306 and 310 is illustrated in FIG. 6. Only mirrors 306 and 310, portions of galvanometer shafts 324 and 328, one lens 312 and a portion of laser beam 302 are shown in FIG. 6. Laser beam 302 is seen to propagate along a beam axis 350. Mirror 306 is positioned so that axis 350 intersects a center point 352 on reflecting surface 334 of mirror 306. Shaft 324 of galvanometer 326, and hence mirror 306, rotate about an axis 354. Over the angular range of rotation about axis 354, in the practice of the present invention, beam axis 350 always intersects center point 352 on reflecting surface 334. Laser beam 302 projects a spot 356 on reflecting surface 334. Mirror 310 is rotatable about an axis 357. Mirrors 306 and 310 are aligned so that axis 350 of the beam as reflected off of mirror 306 and, over the angular range of rotation of mirror 310 about axis 357 practiced in the present invention, always intersects an "x" center line coordinate axis 358 on reflecting surface 336. Mirror 310 further includes a "y" center line coordinate axis 360 on reflecting surface 336, axes 358 and 360 being mutually orthogonal and intersecting at a center point 362. Laser beam 302, reflected off of mirror 306 onto mirror 310, projects a spot 364 on the latter mirror. It is noted that, in FIG. 6, reflecting surface 336 of mirror 310, which beam 302 strikes, faces away from the reader. For this reason, spot 364 is shown as a hidden feature delineated by a broken line.

In FIG. 6, the mirrors are positioned to direct the laser beam to the lens 312 positioned in the upper left portion of lens holder 314 as viewed in FIG. 5. Thus, beam axis 350 intersects the convex surface of the lens and a spot 366 of the laser beam is projected thereon. Also shown in FIG. 6 is a rectangular lens plane 368 having four vertices 370. Plane 368 is additionally defined to have an "x" center line coordinate axis 372 and a "y" center line coodinate axis 374, orthogonal to axis 372, which intersect at a center point 376. The four lenses are positioned such that a center point on the convex face of each lens is positioned at a different one of the four vertices 370. The optical fiber tips associated with the upper left lens are positioned to lie substantially in a fiber tip plane 378 having a center point 380 at the intersection of an "x" center line coordinate axis 382 and a "y" center line coordinate axis 384 orthogonal to axis 382. As indicated in FIG. 6, the distance from the planar face of the upper left lens to plane 378 is substantially equal to a lens focal length "f". Thus, each of the four lenses have associated therewith a different fiber tip plane positioned substantially the distance "f" from the lens planar face. Each fiber tip plane is oriented to be substantially parallel to the planar face of its associated lens. Mirrors 306 and 310 are adapted to scan the focused laser beam over a scanned area 386 of plane 378 within which the tips of the fibers are positioned. It is preferred herein that the tip of one of fibers 304, as held in fiber holder 318, be positioned at center point 380. With mirrors 306 and 310 positioned to focus the beam on this center fiber tip, each lens is positioned so that the axis of the beam passes through the center point of the lens and is perpendicular to both lens faces and fiber tip plane 378. It is noted that focal length "f" of each lens is also determined in accordance with the cone of acceptance of the optical fibers used, as described above, to assure maximum transmissivity of the injected laser beam.

Galvanometer shafts 324 and 328, with mirrors 306 and 310 respectively affixed thereto, assume a rest position in the absence of driving signals to control their movement. In the rest position, mirrors 306 and 310 are each oriented with their respective reflecting surfaces at a 45° angle to the respective portions of beam axis 350 intersecting the mirrors. In the rest position, the mirrors direct the laser beam toward lens plane 368 such that the beam axis intersects center point 376 thereof. Referring again to FIG. 5, an opening 388 is provided in lens support 314 in a region including center point 376. Opening 388 is large enough to enable the unobstructed transmission therethrough of the laser beam. A heat sink, such as a water cooled metal plate, may be positioned in alignment with opening 388, beyond supports 322, to receive the beam when the mirrors assume the rest position. Thus, one safety feature that can be implemented in the practice of the present invention comprises cutting off the galvanometer signals in the event of a detected malfunction thereby directing the laser energy into the heat sink.

With the mirrors in the rest position, axis 350 of the laser beam intersects center point 362 of mirror 310. Using the rest position as a reference position, the scanning of the laser beam by rotation of mirrors 306 and 310 can be better understood. Commencing from the rest position, holding mirror 310 stationary and rotating mirror 306 clockwise (CW) or counter clockwise (CCW) about axis 354, causes the point where beam axis 350 intersects "x" axis 358 of mirror 310 to scan along that "x" coordinate axis, from center point 362, respectively to the right or left, as viewed in FIG. 6. Such rotation of mirror 306 further causes the point where beam axis 350 intersects "x" axis 372 of lens plane 368 to scan along that "x" coordinate axis from center point 376, respectively to the right or left as viewed in FIG. 6. Again commencing from the rest position, but instead holding mirror 306 stationary and rotating mirror 310 clockwise (CW) or counter clockwise (CCW) about axis 357 causes the point where beam axis 350 intersects "y" axis 374 of the lens plane to scan along that "y" coordinate axis, from center point 376, respectively up or down, as viewed in FIG. 6. Note that throughout such rotation of mirror 310 with mirror 306 held stationary in the rest position, the beam axis continuously intersects center points 352 and 362 of mirrors 306 and 310 respectively. It is therefore observed that rotation of mirror 306 effects scanning of the laser beam along the "x" coordinate axis direction of mirror 310, the lens plane and the fiber tip plane. Similarly, mirror 310 rotation results in beam scanning along the "y" coordinate axis direction of the lens and fiber tip planes.

It should therefore now be apparent to one skilled in the art that rotation of both mirrors 306 and 310 is necessary to direct laser beam 302 to any of the four lenses 312. For example, to direct the laser beam to the lens positioned in the upper right portion of lens holder 314, as viewed in FIG. 5, a clockwise rotation of both mirrors 306 and 310 from their respective rest positions is required. In order to direct the focused laser beam into a particular optical fiber tip, it is necessary to rotate mirrors 306 and 310 each into a unique, predeterminable position. Thus, a unique predetermined pair of mirror positions, for mirrors 306 and 310, corresponds to the beam being focused onto each optical fiber tip. Functioning under the control means, the galvanometers are operated to move the mirrors through a sequence of such predetermined position pairs corresponding to a sequence of optical fibers into which the laser beam is to be injected.

As was the case with system 100, it is preferred that the elements of system 300 mounted on base member 316 be enclosed in a light tight enclosure. The use of such an enclosure for system 300 is for substantially the same reasons discussed with respect to system 100.

It is noted that the two galvanometers included in the above-noted XY3035 galvanometer scanner manufactured by General Scanning, Inc., are mounted in system 300 to achieve the mirror and shaft axis positions described herein and not as provided in the XY3035 scanner package, in order to successfully practice the present invention. It is further noted that the shaft of each galvanometer included with the XY3035 scanner extends perpendicularly from a mounting surface, of the galvanometer, that includes threaded mounting holes. Thus, in order to position shafts 324, 328 of these galvanometers as illustrated in FIG. 5, each such galvanometer is preferably mounted with the mounting surface affixed to a planar support member with the galvanometer shaft extending therethrough, the planar member in turn being perpendicularly mounted to base 316.

Figure 7:
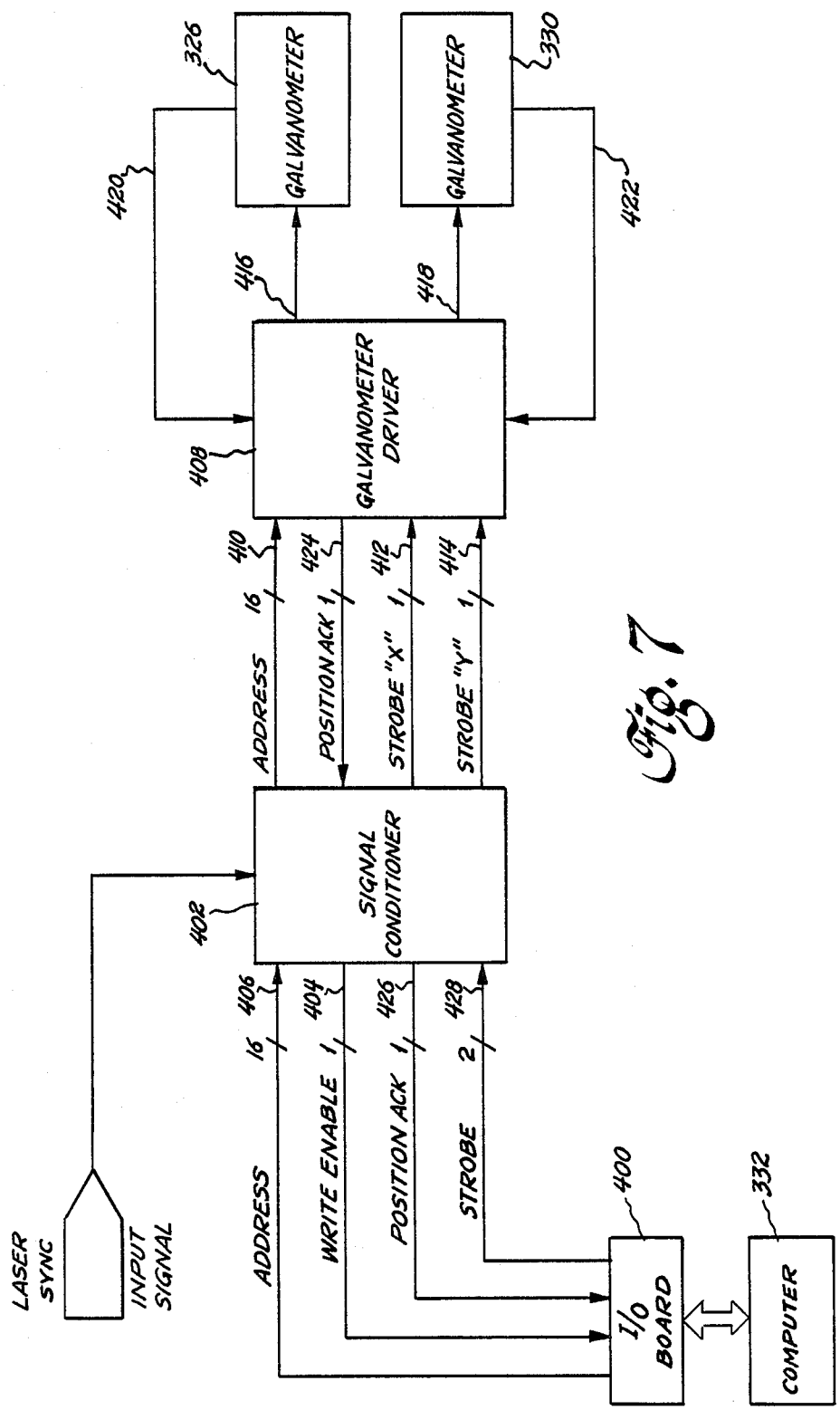
FIG. 7 is a block diagram representation of a control circuit employed in the practice of the second embodiment of the present invention.

Means for the control of galvanometers 326 and 330 with computer 332 are illustrated in FIG. 7. Computer 332, which may comprise an IBM PC/AT computer, is coupled through a parallel I/O board 400 to a signal conditioner 402. Signal conditioner 402 is coupled to receive the laser synchronizing input signal and is adapted in response thereto to provide a pulsed write enable signal, to computer 332, on its output 404. Signal conditioner 402 adjusts the width and delay of each write enable pulse so that each. pulse defines a window for galvanometer driven mirror movement. Each window corresponds to a period when the laser beam is in the off state, substantially as described above for signal conditioner 214 (FIG. 4). Galvanometer driven mirror movement is effected only during the window. Within each window defined by a write enable signal pulse, computer 332 is programmed to generate both a 16-bit "x" galvanometer position address and a 16-bit "y" galvanometer position address, each address so generated being applied to an input 406 of the signal conditioner. The "x" position address corresponds to a position to which mirror 306, driven by galvanometer 326, is to be oriented and the "y" position address corresponds to a position to which mirror 310, driven by galvanometer 330, is to be oriented.

Galvanometers 326 and 330 are driven by a galvanometer driver 408. Driver 408 is adapted to receive a 16-bit position address on an input 410 and treat that address as the "x" position address or the "y" position address depending on whether it receives a strobe signal respectively on a strobe "x" input 412 or a strobe "y" input 414. The galvanometer driver is further adapted to generate an analog signal corresponding to the position address applied thereto for application to the appropriate galvanometer. Thus, an output 416 of driver 408 is coupled to galvanometer 326 for applying an analog "x" position address signal. Further, an output 418 of driver 408 is coupled to galvanometer 430 for applying an analog "y" position address signal. Galvanometers 326 and 330 each feed back an analog position signal, on their respective outputs 420 and 422, to the galvanometer driver. Driver 408 is further adapted to provide a position acknowledge signal on an output 424 which indicates when each galvanometer is oriented to the position corresponding to the desired 16-bit position address. The above-noted model XY3035 galvanometer scanner manufactured by General Scanning, Inc. includes a galvanometer driver and two galvanometers adapted to be controlled substantially as described hereinabove.

Signal conditioner 402 is coupled to receive the position acknowledge signal generated by the galvanometer driver. The signal conditioner is adapted to condition signals being provided to computer 332 as well as those generated by the computer. Such conditioning includes providing isolation from electromagnetic noise effects and compensating for interconnecting cable parameters. The signal conditioner provides the position acknowledge signals, generated by the galvanometer driver, to computer 332 on an output 426. Computer 332 is further programmed to generate the "x" and "y" strobe signal respectively following generation of the "x" and "y" position addresses. The strobe signals are applied to an input 428 of the signal conditioner which in turn applies the signals to the galvanometer driver.

Thus, computer 332 upon receipt of the write enable signal generates the "x" position address and immediately thereafter an "x" strobe signal. The galvanometer driver receives the address and strobe signals via the signal conditioner and in response applies the analog "x" position address signal to galvanometer 326. Driver 408 determines when galvanometer 326 has moved mirror 306 to the desired position by way of the fed back analog position signal and indicates the desired position has been reached via the position acknowledge signal. The latter signal is received by computer 332 via the signal conditioner and, in response, the computer generates the "y" position address. The computer than generates the "y" strobe signal. In response, the galvanometer driver causes galvanometer 330 to orient mirror 310 to the desired position and generates the position acknowledge signal when this is accomplished.

In operation, system 300 is connected through optical fibers 304 to one or more workstations. Computer 332 is programmed to provide a sequence of 16 bit "x" and "y" galvanometer position address pairs, each pair corresponding to mirror positions effective to focus the laser beam, through one of lenses 312, onto the tip of a particular optical fiber. Thus, the sequence of position address pairs defines a sequence of fibers into which the laser is to be injected and, hence, workstation locations to which the beam is to be transmitted. As in system 100, the addresses may be provided in any predetermined order. Thus system 300 operates, substantially the same as system 100, in a hot switching mode wherein mirrors 306 and 310 are repositioned only between successive laser pulses.

Figure 8:
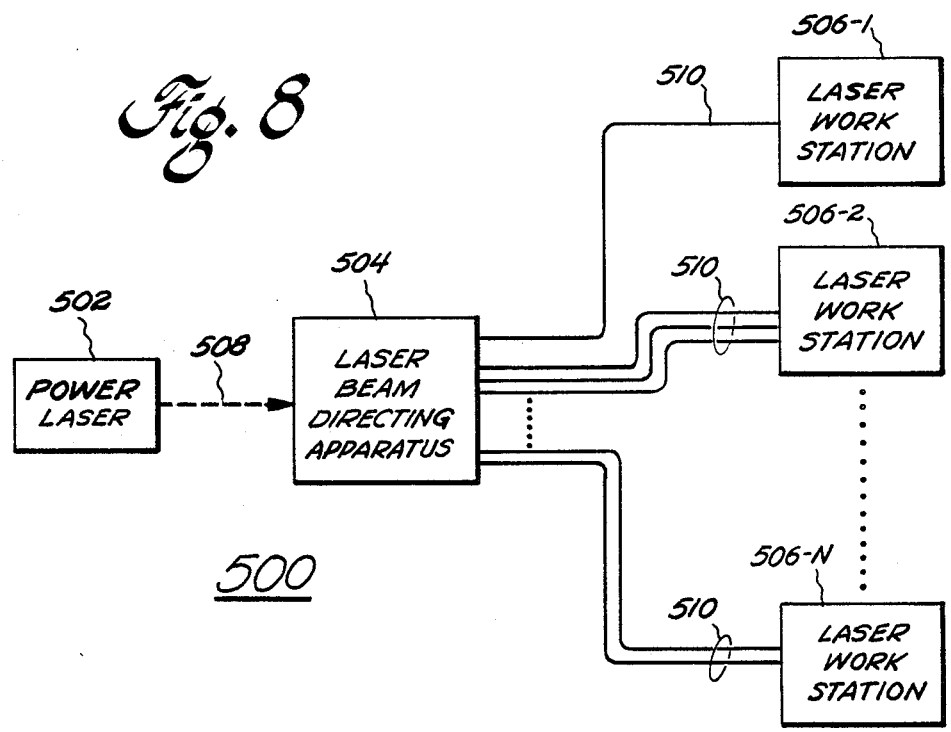
FIG. 8 is a laser workstation system comprising the beam directing apparatus of the present invention.

FIG. 8 illustrates a laser workstation system 500 comprising a pulsed power laser 503, laser beam directing apparatus 504 constructed in accordance with the present invention and a plurality of laser workstations 506-1, 506-2, . . . , 506-N for performing tasks with a pulsed laser beam 508 generated by laser 502. Each laser workstation 506 is coupled to beam directing apparatus 504 by one or more optical fibers 510. Thus, an input end of each fiber is coupled to the beam directing apparatus while an output end of each fiber is coupled to a particular workstation. In the operation of system 500, the beam directing apparatus injects successive pulses of laser beam 508 into the fiber tips at the input ends of those optical fibers connected to work stations requiring use of the laser beam. Thus, by injecting the laser pulses into the tips of those fibers only, the full power of the laser beam, submect to transmission losses in the fibers, is transmitted to the output ends of those fibers and thereby to the workstations coupled thereto.

Figure 9:
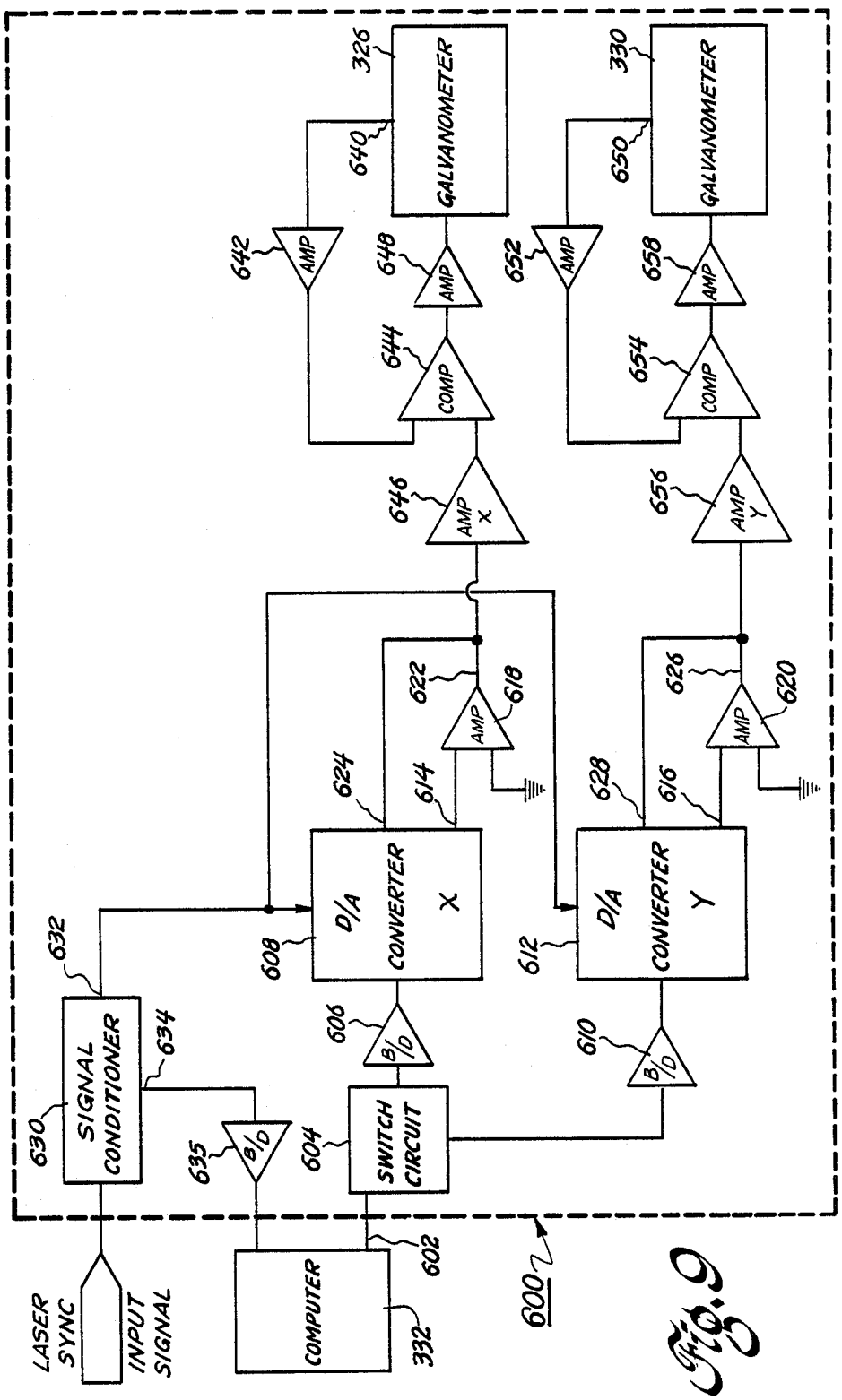
FIG. 9 is a block diagram representation of another control circuit that may be employed in the practice of the second embodiment of the present invention.

While it is stated above that galvanometers 326 and 330, in system 300, may be provided as the composite model XY3035 scanner manufactured by General Scanning, each galvanometer may instead by provided as a discrete element, such as the General Scanning model G350DT galvanometer scanner and associated model CX660 driver amplifier. In such a case however, a control scheme different than that illustrated in FIG. 7 is required to drive the discrete galvanometers. Means for controlling discrete galvanometers 326 and 330 is illustrated in FIG. 9. Computer 332 is coupled through a control interface circuit 600 to the discrete galvanometers. Circuit 600 is constructed to function in a fashion analogous to circuit 200 (FIG. 4) with the computer generating separatus 8-bit "x" and "y" galvanometer position addresses for respectively positioning mirrors 306 and 310. As described above, each "x" and "y" address pair corresponds to a unique, predetermined pair of mirror positions to inject the laser beam into a different optical fiber. Each digital address is conditioned for application to the appropriate galvanometer, subject to a permissive write enable signal, and each galvanometer position is fed back to form a closed loop position control circuit, all in substantially the same fashion as in circuit 200 (FIG. 4).

Thus, computer 332 provides 8 bit "x" and "y" galvanometer position addresses on an output 602. Where the computer can generate the "x" and "y" addresses in sequence and not simultaneously, output 602 is applied to a switching circuit 604 which directs the sequentially generated addresses, in turn, to the appropriate D/A converters. The "x" address is applied to a buffer driver circuit 606 the output of which is connected to an "x" address D/A converter 608. Similarly, the "y" address is applied to a buffer driver circuit 610 having an output connected to a "y" address D/A converter 612. Buffer driver circuits 606 and 610 perform substantially the same function as described above for circuit 202 (FIG. 4). D/A converters 608, 612 may be of the same type as D/A converter 204 (FIG. 4), as described above. D/A converters 608 and 612 provide on their respective outputs 614 and 616 an analog signal corresponding to the digital signal applied thereto. Outputs 614 and 616 are respectively applied to amplifiers 618 and 620. An output 622 of amplifier 618 is fed back to a feedback input 624 of D/A converter 608. Similarly, an output 626 of amplifier 620 is fed back to a feedback input 628 of D/A converter 612. As in the case of circuit 200, the feedback connection to each D/A converter serves to stabilize the converter analog output signal.

A signal conditioner 630 is coupled to receive the laser synchronzing input signal and adapted to provide a pulsed write enable signal on its outputs 632 and 634. Signal conditioner 630 adjusts the write enable signal pulse to define a window for galvanometer driven mirror movement, substantially as described above for signal conditioner 214 (FIG. 4). The write enable signal is applied to the computer via a buffer driver circuit 635 that is substantially the same as circuits 606 and 610. Within each window defined by the write enable signal, both the "x" and "y" position addresses are generated by computer 332, applied to D/A converters 608 and 612 and processed thereby.

Galvanometer 326 provides on an output 640 an analog signal proportional to the angular position of its shaft 324. That shaft position is amplified by an amplifier 642 and applied to a first input of a comparator 644. The stabilized analog signal output 622 of amplifier 618, representative of the "x" galvanometer position address, is amplified by an amplifier 646 and applied to a second input of comparator 644. Amplifiers 642 and 646 are selected to enable comparison of the "x" address and galvanometer 326 position signals. Comparator 644 provides an error signal representative of the difference between the actual and desired galvanometer positions, the error signal being amplified by an amplifier 648 and applied to drive galvanometer 326.

Galvanometer 330 provides its analog shaft position signal on an output 650, that signal being amplified by an amplifier 652 and applied to a first input of a comparator 654. The signal on output 626 of amplifier 620, representative of the "y" galvanometer position address, is amplified by an amplififer 656 and applied to a second input of comparator 654. Amplifiers 652 and 656 enable direct comparison of the actual and desired galvanometer position address signals and the error signal, representative of the difference therebetween, as provided by the comparator is amplified by an amplifier 658 and applied to drive galvanometer 330. As stated above with respect to galvanometer 112, where galvanometers 326 and 330 each comprise the above-noted G35ODT galvanometer scanner and CX660 driver amplifier, the error signal is applied to and position feedback drived from the driver amplifier.

Thus, operation of system 300 using discrete galvanometers proceeds in a fashion analogous to the operation of system 100. The digital "x" and "y" position addresses, generated during the write enable signal defined window, are immediately converted to analog signals and then applied to the galvanometers, the movement of which is controlled in closed loop fashion.

While the second embodiment of the present invention comprises two mirrors wherein the first mirror directs the laser beam onto the second mirror, and the first and second mirrors respectively scan the laser beam along the "x" and "y" coordinate axis directions, the invention is not so limited. The mirrors can instead be arranged so that the first and second mirrors respectively position the laser beam along the "y" and "x" coordinate axis directions.

The computer in the above illustrated embodiments of the present invention provides either 8 or 16-bit galvanometer position addresses. The invention may be practiced with a computer that generates bit addresses of other suitable sizes.

The elements of the above described embodiments of the present invention, including the galvanometers, lenses and fiber holders are indicated as being rigidly mounted. It is preferred herein that the alignment and positions of these elements be precisely determined in advance and the elements rigidly mounted without margin for movement. Such precise layout facilitates later manufacture of the laser beam directing system. The invention is, however, not so limited. The various elements could each instead be mounted in a manner enabling small adjustments in their respective positions, e.g. such as by use of clearance holes, and rigidly fixing the respective elements after the desired alignment is achieved.

Each mirror used in the practice of the present invention has a front surface coated with a dielectric material. Since the reflectivity of that coating decreases as the beam incident angle deviates from the prescribed angle, a small portion of the laser beam can be transmitted by the front surface and reflected from the back surface. While ghost images resulting from back surface reflections do not adversely affect the practice of the present invention, it is desirable to minimize their presence. One way to minimize back surface reflections is to coat the back surface of the mirror with an antireflection coating selected, according to the laser beam wavelength, to reduce reflection of the portion of the beam transmitted by the front surface. It is also noted that the present invention may be successfully practiced wherein the back surface only of each mirror is coated with the reflective dielectric material and not the front surface.

It is further noted that the practice of the present invention is not limited to the use of a coating which provides a maximum reflectivity at a prescribed angle of 45°. The prescribed angle of 45° derives from the preferred mounting of each mirror, in the embodiments illustrated and described hereinabove, so that the range of mirror movement is about a nominal beam incident angle of 45° Each mirror used herein may instead be mounted so that its range of miovement is about a prescribed angle other than 45°. In such a case each mirror would be coated to provide substantially maximum reflectivity about its corresponding prescribed angle.

While the present invention as described hereinbove enables directing each successive laser beam pulse into a different optical fiber, the invention is not so limited. A plurality of successive pulses may be directed into the same fiber before the beam is redirected into a different fiber. This can be simply accomplished by programming the computer to repetitively generate the same position address a desired number of times. The directing of successive pulses into a single fiber is especially advantageous where the operation, e.g. cutting or drilling, being performed at a workstation, at the remote end of the fiber, requires substantial laser energy.

While the present invention as described hereinabove is preferably practiced using a pulsed laser, the invention is not so limited. Instead, by using mechanical chopping techniques known in the art, a beam from a continous wave laser can be converted into a string of pulses having a predetermined frequency with each pulse having a predetermined duration.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. Apparatus for directing a beam of light into one of a plurality of optical fibers, comprising:
   a lens for focusing said light beam;
   means for supporting a group of said optical fibers with the tips thereof positioned proximate a focal point of said lens;
   reflector means for directing said light beam through said lens to selectively focus said light beam separately onto each one of said fiber tips; and
   said lens being the onlylens provided for the purpose of focusing said light beam onto each of said fiber tips.

2. The apparatus of claim 1, said reflector means comprising:
   a mirror for reflecting said light beam; and
   positioning means for orienting said mirror to a plurality of predetermined positions each corresponding to said light beam being focused by said lens on a different one of said fiber tips.

3. The apparatus of claim 2, said positioning means comprising a galvanometer having a shaft on which said mirror is supported; and
   control means for controlling the movement of said galvanometer shaft so that said mirror is oriented to said predetermined positions in a programmed fashion.

4. The apparatus of claim 3 wherein said ciontrol means comprises a digital computer.

5. The apparatus of claim 2 wherein said light beam is generated by a laser;
   a reflecting surface of said mirror on which said light beam falls incident being substantially flat; and
   said reflecting surface of said mirror having a coating characterized by a reflectivity which depends on the angle at which said light beam falls incident on said reflecting surface, said coating providing a maximum reflectivity when said incident light beam is approximately at a prescribed angle to said reflecting surface, said coating provding increasingly lower reflectivities for incident angles greater or less than said prescribed angle.

6. The apparatus of claim 5 wherein said prescribed angle is 45°.

7. The apparatus of claim 2 wherein a reflecting surface of said mirror, on which said light beam falls incident, is substantially flat;
   said fiber tips and a central axis of said light beam substantially disposed in a common plane; and
   said positioning means adapted to rotate said mirror about a rotational axis perpendicular to said common plane, said reflecting surface remaining perpendicular to said common plane while said mirror is rotated.

8. The apparatus of claim 2 wherein said light beam is provided by a pulsed laser, said light beam alternating between an on state and an off state on a periodic basis; and said positioning means adapted to orient said mirror to a different one of said predetermined positions only when said light beam is in said off state.

9. The apparatus of claim 1 wherein said lens has a focal length such that a cone of the focused beam falls within a cone of acceptance of said optical fiber; and said light beam focused on a spot on said fiber tip, said focal length being selected so that said spot has a diameter less than or equal to that of said fiber tip.

10. Apparatus for directing a beam of light into one of a plurality of optical fibers, comprising:

a plurality of lenses each for focusing said light beam;

means for supporting said optical fibers so that a tip of at least one said fiber is positioned proximate a focal point of each said lens; and reflector means for directing said light beam through each said lens to selectively focus said light beam separately onto each one of said fiber tips.

11. The apparatus of claim 10, said reflector means comprising:

a mirror for reflecting said light beam;

a galvanometer having a shaft on which said mirror is supported; and control means for controlling the movement of said galvanometer shaft to orient said mirror into a plurality of predetermined positions each corresponding to said light beam being focused by one of said lenses onto a different one of said fiber tips.

12. The apparatus of claim 11 wherein said light beam is generated by a laser;

a reflecting surface of said mirror on which said light beam falls incident being substantially flat; and said reflecting surface of said mirror having a coating characterized by a reflectivity which depends on the angle at which said light beam falls incident on said reflecting surface, said coating providing a maximum reflectivity when said incident light beam is approximately at a prescribed angle to said reflecting surface.

13. The apparatus of claim 12 wherein said prescribed angle is 45°.

14. The apparatus of claim 11 wherein said light beam is provided by a pulsed laser, said light beam alternating between an on state and an off state on a periodic basis; and said control means adapted to move said galvanometer shaft to focus said light onto a different one of said fiber tips only when said light beam is in said off state.

15. Apparatus for directing a beam of light into one of a plurality of optical fibers, comprising:

a lens for focusing said light beam;

means for supporting a group of said optical fibers with the tips thereof positioned proximate a focal point of said lens, said fiber tipes being substantially positioned in an array having two axis directions;

first reflector means for scanning said light beam along a first one of said two axis directions;

second reflector means for scanning said light beam along a second one of said two axis directions;

said first reflector means positioned to direct said light beam onto said second reflector means;

said first and second reflector means independently orientable to direct said light beam through said lens for selectively focusing said light beam separately onto each of said fiber tips; and said lens being the only lens provided for the purpose of focusing said light beam onto each of said fiber tips.

16. The apparatus of claim 15, said first and second reflector means each comprising:

a mirror for reflecting said light beam;

positioning means for orienting said mirror to one of a plurality of predetermined positions; and each pair of predetermined positions to which said first and second reflector means are respectively oriented corresponding to said light beam being focused by said lens onto a different one of said fiber tips.

17. The apparatus of claim 16, said positioning means comprising a galvanometer having a shaft on which said mirror is supported; and said apparatus further comprising control means for controlling the movement of said shaft of each said galvanometer so that said mirrors are oriented to said predetermined position pairs in a programmed fashion.

18. The apparatus of claim 17 wherein said control means comprises a digital computer.

19. The apparatus of claim 16 wherein said light beam is generated by a laser;

a reflecting surface of each said mirror on which said light beam falls substantially flat;

said reflecting surface of each said mirror having a coating characterized by a reflectivity which depends on the angle at which an axis of said light beam intersects said reflecting surface; and said coating providing a maximum reflectivity when said beam axis is approximately at a prescribed angle to said reflecting surface, said coating providing increasingly lower reflectivities for incident angles greater or less than said prescribed angle.

20. The apparatus of claim 19 wherein said prescribed angle is 45°.

21. The apparatus of claim 16 wherein said light beam is provided by a pulsed laser, said light beam alternating between an on state and an off state on a periodic basis; and said positioning means of said first and second reflector means adapted to orient each said mirror to a different one of said predetermined positions only when said light beam is in said off state.

22. The apparatus of claim 15 wherein said lens has a focal length selected so that a cone of the focused beam is within a cone of acceptance of said optical fiber; and said light beam focused as a spot on said fiber tip, said focal length begin selected so that said spot has a diameter less than or equal to that of said fiber tip.

23. Apparatus for directing a beam of light into one of a plurality of optical fibers, comprising:

a plurality of lenses each for focusing said light beam;

means for supporting said optical fibers so that a tip of each said fiber is positioned proximate a focal point of one of said lenses;

first reflector means for scanning said light beam along a first one of two axis directions;

second reflector means for scanning said light beam along a second one of said two axis directions;

said first reflector means positioned to direct said light beam onto said second reflector means; and said first and second reflector means independently orientable to direct said light beam through each said lens to selectively focus said light beam separately onto each one of said fiber tips.

24. The apparatus of claim 23, said first and second reflector means each comprising:
a mirror for reflecting said light beam;
a galvanometer having a shaft on which said mirror is supported; and
said apparatus further comprising control means for controlling the movement of said shaft of each said galvanometer to orient each said mirror into a plurality of predetermined positions, each pair of predetermined positions to which said mirrors of said first and second reflector means are respectively oriented corresponding to said light beam being focused by one of said lenses onto a different one of said fiber tips.

25. The apparatus of claim 24 wherein said light beam is generated by a laser;
a reflecting surface of each said mirror on which said light beam falls being substantially flat;
said reflecting surface of each said mirror having a coating characterized by a reflectivity which depends on the angle at which an axis of said light beam intersects said reflecting surface; and
said coating providing a maximum reflectivity when said beam axis is approximately at a prescribed angle to said reflecting surface.

26. The apparatus of claim 25 wherein said prescribed angle is 45°.

27. The apparatus of claim 24 wherein said light beam is generated by a pulsed laser, said light beam alternating between an on state and an off state on a periodic basis; and
said control means adapted to move said galvanometer shafts of said first and second reflecting means to focus said light beam onto a different one of said fiber tips only when said light beam is in said off state.

28. Apparatus for directing a beam of light into one of a plurality of optical fibers, comprising:
a first lens;
a second lens;
a third lens;
a fourth lens;
first means for supporting at least one of said optical fibers with the tip thereof positioned proximate a focal point of said first lens;
second support means for supporting at least one of said optical fibers with the tip thereof positioned proximate a focal point of said second lens;
third support means for supporting at least one of said optical fibers with the tip thereof positioned proximate a focal point of said third lens;
fourth support means for supporting at least one of said optical fibers with the tip thereof positioned proximate a focal point of said fourth lens;
first reflector means for scanning said light beam along a first one of two axis directions;
second reflector means for scanning said light beam along a second one of said two axis directions;
said first reflector means positioned to direct said light beam onto said second reflector means; and
said first and second reflector means independently orientable to direct said light beam through a selected one of said lenses for selectively focusing said light beam separately onto each said fiber tip positioned proximate the focal point of said selected lens.

29. The apparatus of claim 28, said first and second reflector means each comprising:
a mirror for reflecting said light beam;
positioning means for orienting said mirror to one of a plurality of predetermined positions; and
each pair of predetermined positions to which said first and second reflector means are respectively oriented corresponding to said light beam being focused by said selected lens on a different one of said fiber tips.

30. The apparatus of claim 29, said positioning means comprising a galvanometer having a shaft on which said mirror is supported; and
said apparatus further comprising control means for controlling the movement of each said galvanometer shaft so that said mirrors are oriented to said predetermined position pairs in a programmed fashion.

31. The apparatus of claim 30 wherein said control means comprises a digital computer.

32. The apparatus of claim 29 wherein said light beam is generated by a laser;
a reflecting surface of each said mirror on which said light beam falls being substantially flat;
said reflecting surface of each said mirror having a coating characterized by a reflectivity which depends on the angle at which an axis of said light beam intersects said reflecting surface; and
said coating providing a maximum reflectivity when said beam axis is approximately at a presribed angle to said reflecting surface.

33. The apparatus of claim 32 wherein said light beam is generated by a Neodymium:YAG laser; and
said coating on said reflecting surface comprising a dielectric material.

34. The apparatus of claim 29 wherein said light beam is provided by a pulsed laser, said light beam alternating between an on state and an off state on a periodic basis; and
said positioning means of said first and second reflector means adapted to orient each said mirror to a different one of said predetermined positions only when said light beam is in said off state.

35. The apparatus of claim 34 wherein said light beam is generated by a Neodymium:YAG laser.

36. The apparatus of claim 35 wherein each said mirror includes a substantially flat reflecting surface on which said light beam falls;
said reflecting surface of each mirror having a dielectric coating characterized by a reflectivity which depends on an angle at which an axis of said light beam intersects said reflecting surface, said coating providing a maximum reflectivity when said beam axis is approximately at a prescribed angle to said reflecting surface.

37. The apparatus of claim 36 wherein said prescribed angle is 45°.

38. The apparatus of claim 38 wherein each said lens is a plano-convex lens, the planar face of each said lens facing said fiber tip associated therewith; and
each said lens positioned so that an axis of said light beam passing through a center point of said lens is substantially perpendicular to the planar and convex faces of said lens.

39. A laser workstation system, comprising:
a plurality of optical fibers each adapted for the transmission therethrough of a laser beam;
means for directing a laser beam into an input end of selected ones of said optical fibers for transmission of said laser beam therethrough;

a plurality of workstations each coupled to an output end of at least one of said optical fibers to receive said laser beam transmitted thereto via said optical fiber by said beam directing means;

said beam directing means including:
a lens for focusing said laser beam;
means for supporting said optical fibers with the tips at the respective input ends thereof positioned proximate a focal point of said lens;
reflector means for directing said laser beam through said lens to selectively focus said laser beam separately onto each one of said fiber tips; and
said lens being the only lens provided for the purpose of focusing said laser beam onto each of said fiber tips.

40. The laser system of claim 39, said reflector means comprising:
a mirror for reflecting said laser beam;
a galvanometer having a shaft on which said mirror is supported; and
control means for controlling the movement of said galvanometer shaft to orient said mirror into a plurality of predetermined positions each corresponding to said laser beam being focused by said lens onto a different one of said fiber tips.

41. The laser system of claim 40 wherein said laser beam is provided by a pulsed laser, said laser beam alternating between an on state and an off state on a periodic basis; and
said control means adapte to move said galvanometer shaft to focus said laser beam onto a different one of said fiber tips only when said laser beam is in said off state.

42. A laser workstation system, comprising:
a plurality of optical fibers each adapted for the transmission therethrough of a laser beam;
means for directing a laser beam into an input end of selected ones of said optical fibers for transmission therethrough of said laser beam;
a plurality of workstations each coupled to an output end of at least one of said optical fibers to receive said laser beam transmitted thereto via said optical fiber by said beam directing means:
said beam directing means including:
a lens for focusing said laser beam;
means for supporting said optical fibers with the tips at the respective input ends thereof positioned proximate a focal point of said lens, said fiber tips being positioned in an array having two axis directions;
first reflector means for scanning said laser beam along a first one of said two axis directions;
second reflector means for scanning said laser beam along a second one of said two axis directions;
said first reflector means positioned to direct said laser beam onto said second reflector means;
said first and second reflector means independently orientable to direct said laser beam through said lens for selectively focusing said laser beam separately onto each of said fiber tips; and
said lens being the only lens provided for the purpose of focusing said laser beam onto each of said fiber tips.

43. The laser system of claim 42, said first and second reflector means each comprising:
a mirror for reflecting said laser beam;
a galvanometer having a shaft on which said mirror is supported; and
said beam directing means further comprising control means for controlling the movement of said shaft of each said galvanometer to orient each said mirror into a plurality of predetermined positions, each pair of predetermined positions to which said mirrors are oriented corresponding to said laser beam being focused by said lens onto a different one of said fiber tips.

44. The laser system of claim 43 wherein said laser beam is generated by a pulsed laser, said laser beam alternating between an on state and an off state on a periodic basis; and
said control means adapted to move said galvanometer shafts of said first and second reflector means to focus said laser beam onto a different one of said fiber tips when said laser beam is in said off state.

45. A method for delivering a laser beam to a plurality of workstation locations, each said workstation location coupled to an output end of an optical fiber, said method comprising the steps of:
supporting a group of said optical fibers with a fiber tip at an input end of each said fiber proximate a focal point of a focusing lens; and
directing said laser beam through said lens to selectively focus said laser beam separately onto said fiber tips so that said laser beam is delivered to the output end of each said optical fiber into which it is directed, said lens being the only lens provided for the purpose of focusing said laser beam onto each of said fiber tips.

46. The method of claim 45 wherein said laser beam pulses between an on state and an off state, said directing step comprising the substeps of:
reflecting said laser beam off of a mirror and through said lens; and
orienting said mirror during each said off state of said laser beam to a desired one of a plurality of predetermined mirror positions each corresponding to said laser beam being focused by said lens onto a different one of said fiber tips.

47. The method of claim 46 wherein said mirror comprises a first and a second mirror, said reflecting step comprising the substeps of:
reflecting said laser beam off of said first mirror and onto said second mirror, said first mirror being adapted to scan said laser beam along a first one of two axis directions;
reflecting said laser beam off of said second mirror and through said lens, said second mirror adapted to scan said laser beam along a second one of said two axis directions; and
said orienting step further comprising orienting said first and second mirrors to their respective predetermined positions, each pair of predetermined positions to which said first and second mirrors are respectively oriented corresponding to said laser beam being focused by said lens onto a different one of said fiber tips.

48. Apparatus for directing a beam of light into one of a plurality of optical fibers, comprising:
a plurality of lenses each for focusing said light beam;
a plurality of means for supporting said optical fibers, each said support means supporting a different group of said optical fibers with the tips thereof positioned proximate a focal point of a different one of said lenses;

reflector means for directing said light beam through each said lens to selectively focus said light beam separately onto each one of said fiber tips;

said reflector means including:
a mirror for reflecting said light beam; and
positioning means for orienting said mirror to a plurality of predetermined positions each corresponding to said light beam being focussed by one of said lenses on a different one of said fiber tips;

said fiber tips and a central axis of said light beam substantially disposed in a common plane; and each said lens disposed in a plane perpendicular to said common plane and equidistantly spaced from said mirror.

49. The apparatus of claim 48 wherein said light beam is provided by a pulsed laser, said light beam alternating between an on state and an off state on a periodic basis; and said positioning means adapted to orient said mirror to a different one of said predetermined positions only when said light beam is in said off state.

50. Apparatus for directing a beam of light into one of a plurality of optical fibers, comprising:
a plurality of lenses each for focusing said light beam;
a plurality of means for supporting said optical fibers, each said support means supporting a different group of said optical fibers with the tips thereof positioned proximate a focal point of a different one of said lenses, the fibers tips in each group being substantially positioned in an array having two axis directions;
first reflector means for scanning said light beam along a first one of said two axis directions;
second reflector means for scanning said light beam along a second one of said two axis directions;
said first reflector means positioned to direct said light beam onto said second reflector means; and
said first and second reflector means being independently orientable to direct said light beam through each of said lenses for selectively focusing said light beam separately onto each of said fiber tips of the optical fiber group associated therewith.

51. A laser workstation system, comprising:
a plurality of optical fibers each adapted for the transmission therethrough of a laser beam;
means for directing a laser beam into an input end of selected ones of said optical fibers for transmission of said laser beam therethrough;
a plurality of workstations each coupled to an output end of at least one of said optical fibers to receive said laser beam transmitted thereto via said optical fiber by said beam directing means;
said beam directing means including:
a plurality of lenses each for focusing said laser beam;
a plurality of means for supporting said optical fibers, each said support means supporting a different group of said optical fibers with the tips at respective ends thereof positioned proximate a focal point of a different one of said lenses; and
reflector means for directing said laser beam through each said lens to selectively focus said laser beam separately onto each one of said fiber tips;
said reflector means including:
a mirror for reflecting said laser beam;
a galvanometer having a shaft on which said mirror is supported; and
control means for controlling the movement of said galvanometer shaft to orient said mirror into a plurality of predetermined positions each corresponding to said laser beam being focussed by one of said lenses onto a different one of said fiber tips;
said fiber tips and a central axis of said laser beam substantially disposed in a common plane; and
each of said lenses disposed in a plane perpendicular to said common plane and equidistantly spaced from said mirror.

52. A laser workstation, comprising:
a plurality of optical fibers each adapted for the transmission therethrough of a laser beam;
means for directing a laser beam into an input end of selected ones of said optical fibers for transmission therethrough of said laser beam;
a plurality of workstations each coupled to an output end of at least one of said optical fibers to receive said laser beam transmitted thereto via said optical fiber by said beam directing means;
said beam directing means including:
a plurality of lenses each for focusing said laser beam;
a plurality of support means for supporting said optical fibers, each said support means supporting a different group of said optical fibers with the tips at the respective input ends thereof positioned proximate a focal point of a different one of said lenses, said fiber tips being positioned in an array having two axis directions;
first reflector means for scanning said laser beam along a first one of said two axis directions;
second reflector means for scanning said laser beam along a second one of said two axis directions;
said first reflector means positioned to direct said laser beam onto said second reflector means; and
said first and second reflector means independently orientable to direct said laser beam through each one of said lenses for selectively focusing said laser beam separately onto each of said fiber tips;
said first and second reflector means each comprising:
a mirror for reflecting said laser beam; and
a galvanometer having a shaft on which said mirror is supported; and
said beam directing means further comprising control means for controlling the movement of said shaft of each said galvanometer to orient each said mirror into a plurality of predetermined positions, each pair of predetermined positions to which said mirrors are oriented corresponding to said laser beam being focussed by said lens onto a different one of said fiber tips.

53. A method for delivering a laser beam to a plurality of workstation locations, each said workstation location coupled to an output end of an optical fiber, said laser beam pulsing between an on state and an off state, said method comprising the steps of:
supporting a plurality of groups of said optical fibers with a fiber tip at an input end of each said fiber proximate a focal point of an associated one of a plurality of focusing lenses;
directing said laser beam separately through each said lens to selectively focus said laser beam separately onto said fiber tips so that said laser beam is delivered to the output end of each said optical fiber into which it is directed;

said directing step comprising the substeps of:
reflecting said laser beam off a first mirror and onto a second mirror, said first mirror being adapted to scan said laser beam along a first one of two axis directions;

reflecting said laser beam off of said second mirror and through one of said lenses, said second mirror adapted to scan laser beam along a second one of said two axis directions; and orienting said first and second mirrors during each said off state of said laser beam to respective predetermined positions, each pair of predetermined positions to which said first and second mirrors are respectively oriented corresponding to said laser beam being focused by one of said lenses onto a different one of said fiber tips.

* * * * *